United States Patent
Liu et al.

(10) Patent No.: US 11,515,806 B2
(45) Date of Patent: *Nov. 29, 2022

(54) CONVERSION DEVICE HAVING REDUCED COMMON-MODE CURRENT

(71) Applicant: Delta Electronics (Shanghai) CO., LTD, Shanghai (CN)

(72) Inventors: Teng Liu, Shanghai (CN); Jianping Ying, Shanghai (CN); Lifeng Qiao, Shanghai (CN); Xin Wang, Shanghai (CN); Hongwei Xiao, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 20 days.

This patent is subject to a terminal disclaimer.

(21) Appl. No.: 17/314,663

(22) Filed: May 7, 2021

(65) Prior Publication Data
US 2021/0376753 A1    Dec. 2, 2021

(30) Foreign Application Priority Data
May 26, 2020 (CN) .......................... 202010456292.5

(51) Int. Cl.
*H02M 7/217* (2006.01)
*H02M 1/12* (2006.01)
(Continued)

(52) U.S. Cl.
CPC ......... *H02M 7/2173* (2013.01); *H02M 1/123* (2021.05); *H02M 1/126* (2013.01);
(Continued)

(58) Field of Classification Search
CPC .. H02M 3/33569; H02M 5/4585; H02M 7/23; H02M 7/537; H02M 1/123;
(Continued)

(56) References Cited

U.S. PATENT DOCUMENTS 5,355,297 A * 10/1994 Kawabata ............... H02P 27/14
363/43
5,644,483 A * 7/1997 Peng ...................... H02M 7/487
363/37
(Continued)

FOREIGN PATENT DOCUMENTS

CN      103311944 A      9/2013
CN      102377192 B      11/2013
(Continued)

OTHER PUBLICATIONS

The Extended European Search Report dated Dec. 16, 2021 for EP patent application No. 21171009.0.
(Continued)

*Primary Examiner* — Yusef A Ahmed
(74) *Attorney, Agent, or Firm* — Qinghong Xu

(57) ABSTRACT

A conversion device includes: an inductor connected to the AC power grid; a first-stage converter configured to output a bus voltage based on the AC power grid; a second-stage converter configured to convert the bus voltage into an output voltage to the load; and a filtering network, wherein a first resistance-capacitance circuit is disposed between the first and third terminals of the filtering network, a second resistance-capacitance circuit is disposed between the second and third terminals of the filtering network, the first terminal of the filtering network is connected to the AC power grid, the second terminal of the filtering network is connected to the bus or the second terminal of the second-stage converter, and the third terminal of the filtering network is grounded through a first capacitor.

12 Claims, 9 Drawing Sheets

US 11,515,806 B2
Page 2

(51) Int. Cl.
- *H02M 7/08* (2006.01)
- *H02M 7/487* (2007.01)
- *H02M 7/483* (2007.01)
- *H02M 1/44* (2007.01)

(52) U.S. Cl.
CPC ............ *H02M 7/08* (2013.01); *H02M 7/483* (2013.01); *H02M 7/487* (2013.01); *B60L 2210/30* (2013.01); *H02M 1/44* (2013.01); *H02M 7/217* (2013.01)

(58) Field of Classification Search
CPC .. H02M 1/126; H02M 1/0032; H02M 1/0077; H02M 1/088; H02M 3/01; H02M 7/4807; H02M 7/4815; H02M 7/487; H02M 7/493; H02M 1/0074; H02M 7/219; H02M 7/2173; H02M 7/08; H02M 7/483; H02M 1/44; B60L 53/30; B60L 2210/10; B60L 2210/30; B60L 2210/40
See application file for complete search history.

(56) References Cited

U.S. PATENT DOCUMENTS

| | | | |
|---|---|---|---|
| 6,385,057 B1 | 5/2002 | Barron | |
| 8,811,048 B2* | 8/2014 | Zhang | H02P 27/14 363/45 |
| 9,473,021 B2* | 10/2016 | Hsiao | H02J 3/381 |
| 10,770,987 B2* | 9/2020 | Kumar | H02H 1/043 |
| 10,940,813 B2* | 3/2021 | Kumar | B23K 9/1043 |
| 2003/0218838 A1* | 11/2003 | Poulsen | H02M 7/062 361/23 |
| 2006/0227483 A1* | 10/2006 | Akagi | H02M 1/12 361/118 |
| 2009/0109713 A1* | 4/2009 | Schnetzka | H02M 5/4585 361/699 |
| 2009/0237962 A1* | 9/2009 | Yun | H02M 7/49 363/37 |
| 2010/0148508 A1* | 6/2010 | Garcia | H02J 3/50 290/44 |
| 2010/0156185 A1* | 6/2010 | Kim | H02J 3/387 307/82 |
| 2011/0089693 A1* | 4/2011 | Nasiri | F03D 7/0272 290/44 |
| 2011/0141774 A1* | 6/2011 | Kane | H02M 5/4585 363/44 |
| 2013/0308352 A1* | 11/2013 | Wu | H02M 1/44 363/39 |
| 2014/0001759 A1* | 1/2014 | Gupta | H02J 3/381 290/44 |
| 2014/0140112 A1* | 5/2014 | Zhou | H02M 1/126 363/39 |
| 2014/0210271 A1 | 7/2014 | Toyoda | |
| 2014/0211520 A1* | 7/2014 | Zhang | H02M 1/126 363/37 |
| 2014/0254228 A1 | 9/2014 | Ying et al. | |
| 2014/0268933 A1* | 9/2014 | Zhou | H02M 1/12 363/44 |
| 2016/0268950 A1* | 9/2016 | Cho | H02P 27/14 |
| 2016/0268951 A1* | 9/2016 | Cho | H02M 1/14 |
| 2016/0315540 A1* | 10/2016 | Dilley | H02M 7/797 |
| 2016/0322809 A1 | 11/2016 | Wang et al. | |
| 2017/0005565 A1* | 1/2017 | Bai | H02M 1/4258 |
| 2017/0063260 A1* | 3/2017 | Li | H02P 5/74 |
| 2018/0041035 A1* | 2/2018 | Ying | H02J 3/36 |
| 2018/0041110 A1* | 2/2018 | Liu | H02P 29/50 |
| 2018/0131271 A1* | 5/2018 | Ying | H02M 5/4585 |
| 2018/0278168 A1* | 9/2018 | Brown | H02J 7/022 |
| 2018/0342943 A1* | 11/2018 | Yuan | H02M 1/32 |
| 2019/0067932 A1* | 2/2019 | Li | H02M 7/2173 |
| 2019/0312425 A1* | 10/2019 | Xiao | H02H 3/165 |
| 2020/0177100 A1* | 6/2020 | Wang | H02M 1/083 |
| 2021/0165933 A1* | 6/2021 | Larsson | H02J 3/00 |
| 2021/0273557 A1* | 9/2021 | Liu | H02M 1/4233 |
| 2021/0384816 A1* | 12/2021 | Xiao | H02M 1/32 |
| 2021/0391820 A1* | 12/2021 | Morris | H02P 23/14 |
| 2021/0408915 A1* | 12/2021 | Fu | H02M 1/44 |
| 2022/0190744 A1* | 6/2022 | Everts | H02M 1/4216 |

FOREIGN PATENT DOCUMENTS

| | | |
|---|---|---|
| CN | 103401467 A | 11/2013 |
| CN | 108988447 A | 12/2018 |
| EP | 0899859 A2 | 3/1999 |
| EP | 9949559 A2 | 9/1999 |
| WO | 9949559 A2 | 9/1999 |

OTHER PUBLICATIONS

Young-Kwang Son et al:"Analysis on current flowing through deactivated modules in parallel connected ACDC converters",May 22, 2016(May 22, 2016), pp. 761-767.
Onur Cetin N et al: "Compatibility Issues Between the Filter and PWM Unit in Three-Phase AC Motor Drives Utilizing the Pure Sine Filter Configuration", Nov. 1, 2011 (Nov. 1, 2011), pp. 2559-2569.
The Extended European Search Report dated Sep. 23, 2021 for EP patent application No. 21170736.9.
Vedreno-Santos Francisco et al:"Design considerations for high-power converters interfacing 10 MW superconducting wind power generators",Oct. 6, 2017 (Oct. 6, 2017), pp. 1461-1467.
Backlund B et al: "Topologies, voltage ratings and state of the art high power semiconductor devices for medium voltage wind energy conversion", Jun. 24, 2009 (Jun. 24, 2009), pp. 1-6.
Hitachi Power Semiconductor Device et al: "(High Voltage IGBT Module) Application Manual",Dec. 30, 2009 (Dec. 30, 2009).
Tu Hao et al: "Extreme Fast Charging of Electric Vehicles: A Technology Overview", Dec. 10, 2019 (Dec. 10, 2019), pp. 861-878.
Son Myeongsu et al: "Unidirectional Vienna Converter Design Based On Series-Connected Component", Nov. 25, 2019 (Nov. 25, 2019), pp. 1-6.
The Extended European Search Report dated Sep. 23, 2021 for EP patent application No. 21171009.0.

* cited by examiner

CONVERSION DEVICE HAVING REDUCED COMMON-MODE CURRENT

CROSS REFERENCE

This application is based upon and claims priority to Chinese Patent Application No. 202010456292.5, filed on May 26, 2020, the entire contents of which are incorporated herein by reference.

TECHNICAL FIELD

The present disclosure relates to the technical field of power electronics, in particular, to a conversion device.

BACKGROUND

In recent years, compared with traditional Alternating Current (AC) power distribution systems, power transmission methods represented by Direct Current (DC) have received more and more attention from an industry. With development of new energy technologies and an increase of direct current loads, advantages of DC power transmission in combination with new energy power generation have become more prominent. The DC power transmission omits a stage for conversion between DC and AC and reduces system cost. On a user side, with development of internet technologies, scale of a data center has reached several megawatts, or even tens of megawatts. An electric vehicle industry develops fast, and the number of electric vehicles in China is increasing rapidly. A prospect of growth of the electric vehicles is bright, and with development of the electric vehicles, the demand for high-power charging piles is gradually expanding.

It should be noted that the information disclosed in the Background above is only for enhancing the understanding of the background of the present disclosure, and thus may include information that does not constitute prior art known to those of ordinary skill in the art.

SUMMARY

According to the embodiments of the present disclosure, there is provided a conversion device connected between an Alternating Current (AC) power grid and a load. The conversion device includes: an inductor, electrically connected to the AC power grid; a first-stage converter having a first terminal electrically connected to the inductor and a second terminal electrically connected to a bus, and the first-stage converter being configured to output a bus voltage based on an input voltage from the AC power grid; a second-stage converter having a first terminal electrically connected to the bus and a second terminal electrically connected to the load, and the second-stage converter being configured to convert the bus voltage into an output voltage to provide energy to the load; and a filtering network having a first terminal, a second terminal and a third terminal, wherein a first resistance-capacitance circuit is disposed between the first terminal and the third terminal of the filtering network, and a second resistance-capacitance circuit is disposed between the second terminal and the third terminal of the filtering network, the first terminal of the filtering network is electrically connected to the AC power grid, the second terminal of the filtering network is electrically connected to the bus or the second terminal of the second-stage converter, and the third terminal of the filtering network is grounded through a first capacitor.

In some embodiments, a second capacitor and a third capacitor are connected between the buses and are connected in series across the bus, and the second terminal of the filtering network is electrically connected between the second capacitor and the third capacitor.

In some embodiments, a fourth capacitor is connected across the bus.

In some embodiments, the inductor includes a common-mode and differential-mode integrated inductor and is disposed between the AC power grid and the first-stage converter.

In some embodiments, the inductor includes a differential-mode inductor and a common-mode inductor, the differential-mode inductor is connected between the AC power grid and the first-stage converter, and the common-mode inductor is disposed between the AC power grid and the second terminal of the second-stage converter.

In some embodiments, the inductor includes a differential-mode inductor and a common-mode inductor, the differential-mode inductor is connected between the AC power grid and the first-stage converter, and the common-mode inductor is disposed between the first terminal and the second terminal of the filtering network.

In some embodiments, the first resistance-capacitance circuit includes a first resistor and a fifth capacitor connected in series, and the second resistance-capacitance circuit includes a second resistor and a sixth capacitor connected in series.

In some embodiments, the first-stage converter includes an N-level AC-DC converter which includes a plurality of switching bridge arms, wherein both an upper arm and a lower arm of each of the switching bridge arms of the AC-DC converter include a plurality of semiconductor devices connected in series, and a rated withstand voltage Vsemi of each of the semiconductor devices is greater than or equal to $(Vbus*\delta)/((N-1)*Nseries*\lambda)$, where Vbus represents the bus voltage, $\delta$ represents bus fluctuation, N represents a number of levels of the first-stage converter, $\lambda$ represents a voltage derating factor of the semiconductor device and $\lambda \leq 1$, Nseries represents a number of semiconductor devices connected in series and Nseries$\geq 2$.

In some embodiments, the load includes a DC load or an AC load, and the second-stage converter correspondingly includes a DC-DC converter or a DC-AC converter which is electrically connected to the load.

In some embodiments, the conversion device further includes a controller and a DC circuit breaker, the DC circuit breaker is disposed between the first-stage converter and the second-stage converter and is electrically connected to the controller, and an operation of the DC circuit breaker is controlled based on a control signal sent by the controller.

In some embodiments, the first-stage converter includes at least two AC-DC converters connected in parallel.

In some embodiments, the second-stage converter includes at least two DC-DC converters or DC-AC converters which are connected in series or in parallel.

In some embodiments, the conversion device further includes a controller which detects power of the load and controls operating states of the at least two AC-DC converters connected in parallel based on the power of the load.

In some embodiments, when the load is fully loaded, all the AC-DC converters operate.

In some embodiments, when the load is lightly loaded or half loaded, the controller controls part of the at least two AC-DC converters connected in parallel to operate, and controls remaining of the at least two AC-DC converters connected in parallel not to operate.

In some embodiments, the first-stage converter includes any one of the following AC-DC converters; a two-level rectifier, a three-level Vienna rectifier, and a three-level neutral point clamped converter.

In some embodiments, the third terminal of the filtering network is grounded through the first capacitor and a seventh capacitor, respectively.

In some embodiments, the second terminal of the second-stage converter comprises two second terminals, an eighth capacitor is connected between the two second terminals, and the second terminal of the filtering network is electrically connected to one of the two second terminals of the second-stage converter It should be understood that the above general description and the following detailed description are merely exemplary and explanatory and should not be construed as limiting the present disclosure.

BRIEF DESCRIPTION OF THE DRAWINGS

The accompanying drawings, which are incorporated into and constitute a part of the specification, show embodiments consistent with the present disclosure, and serve to explain the principles of the present disclosure together with the specification. It is apparent that the drawings in the following description show only some of the embodiments of the present disclosure, and other drawings can be obtained by those skilled in the art based on these drawings without any creative effort.

DETAILED DESCRIPTION

Figure 1:
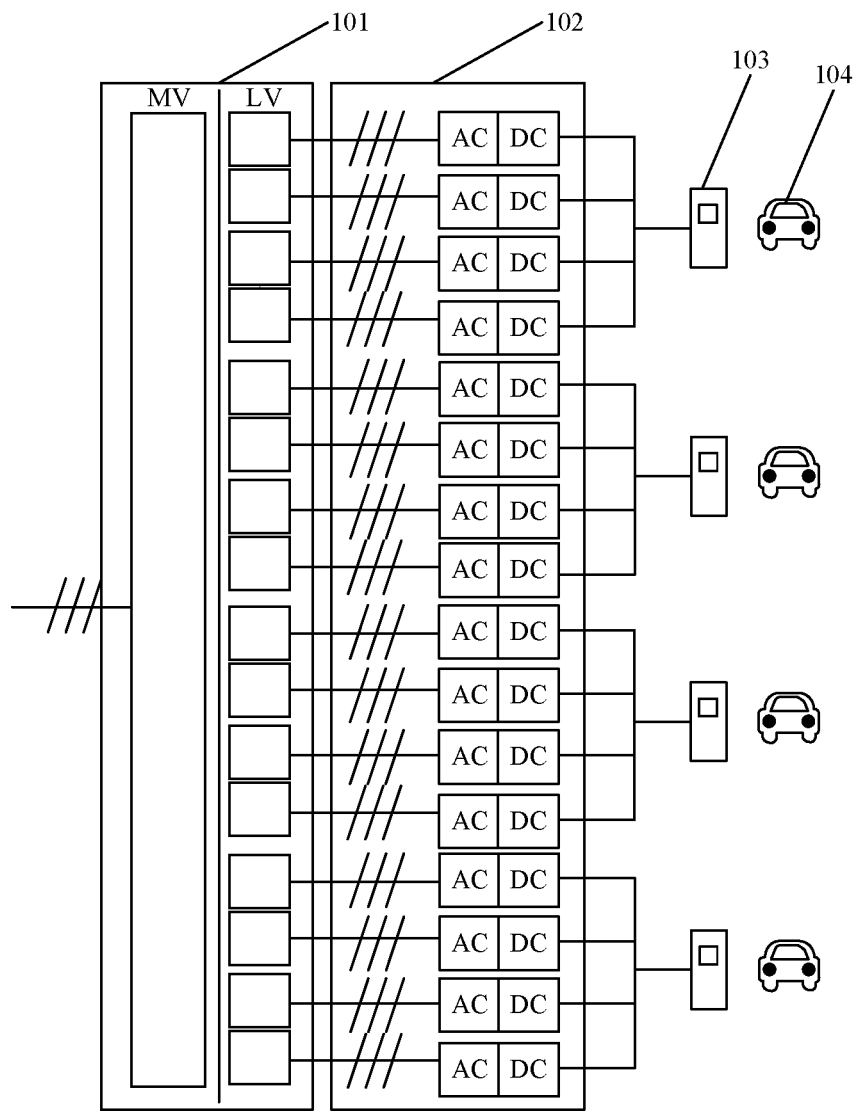
FIG. 1 is a structural schematic diagram schematically showing a conversion device using a medium-voltage transformer in the related art.

Exemplary embodiments will now be described more fully with reference to the drawings. However, the exemplary embodiments can be implemented in various forms, and should not be construed as being limited to the examples set forth herein, rather, these embodiments are provided to make the present disclosure more comprehensive and complete, and fully convey the ideas of the exemplary embodiments to those skilled in the art.

In addition, the features, structures, or characteristics described above can be combined in any suitable manner in one or more embodiments. In the description below, numerous specific details are set forth to provide a thorough understanding of the embodiments of the present disclosure. However, those skilled in the art will appreciate that the technical solution of the present disclosure can be practiced without one or more of the specific details, or in other methods, components, devices, steps and the like. In other instances, well-known methods, devices, implementations or operations are not shown or described in detail to avoid obscuring various aspects of the present disclosure.

Blocks shown in the drawings are functional entities and do not necessarily correspond to physically separate entities. That is, these functional entities can be implemented in software, or implemented in one or more hardware modules or integrated circuits, or implemented in different networks and/or processor devices and/or microcontroller devices.

Flowcharts shown in the drawings are only exemplary illustrations, and it is not necessary to include all contents and operations/steps, nor to be performed in the described order. For example, some of the operations/steps can also be decomposed, and some of the operations/steps can be merged or partially merged, and thus an actual order for performing may change according to actual situations.

Traditional conversion devices have many problems in high-power applications. FIG. 1 shows a topology structure of a conversion device that provides a charging power source 103 for an electric vehicle 104, as shown in FIG. 1, a Medium-Voltage (MV) transformer 101 is connected to a MV power grid on a primary side, and multiple windings on a secondary side provide a Low-Voltage (LV) AC output. The medium-voltage transformer 101 can realize medium voltage isolation, so a power electronic converter 102 on a posterior stage can adopt a non-isolated scheme. This scheme has advantages of high full-load efficiency (98%), mature technology and high reliability, but the transformer used therein has a large volume, and in a case of a light load output, it has disadvantages of low efficiency and high harmonic content (Total Harmonic Distortion, THD). For example, under a system power of 2.4 MW, if a light load of 100 kW is outputted, the efficiency is only 92.5%. In actual applications, there are fewer cases for the full load, and most of the cases it is operated under the light load or the half load.

Figure 2:
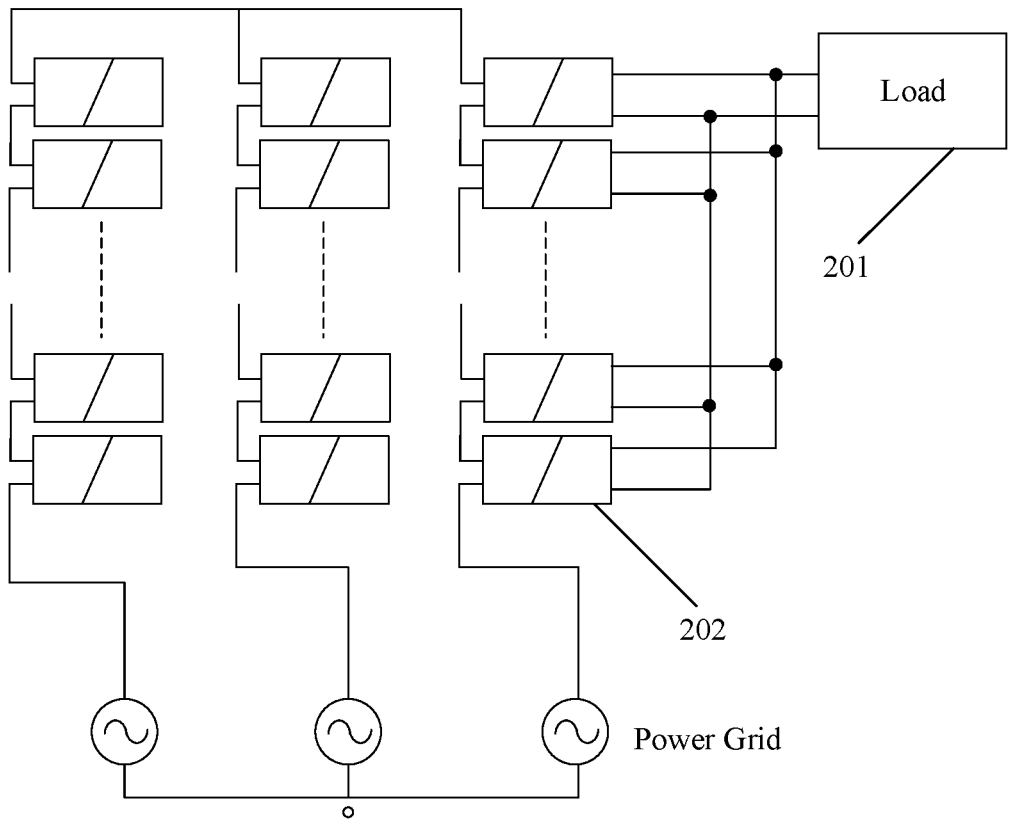
FIG. 2 is a structural schematic diagram schematically showing a conversion device using a cascaded H-bridge structure in the related art.

As shown in FIG. 2, in the conversion device that uses the traditional medium-voltage scheme to supply power to a load 201, a structure of modules 202 is used. This scheme has advantages of mature technology and reliability, but since DC bus capacitors of the modules 202 are located in each of single-phase bridge arms, a phase current of each phase flowing through the capacitor of the phase separately will cause power to fluctuate at double frequency. As a result, a large number of capacitors need to be configured to reduce ripple voltages of the capacitors, which will cause a decrease in a power density of the power modules and an increase in the volume of the system.

In view of the above problems, a concept of medium voltage DC micro-grid has been proposed. A DC power grid combined with new energy and energy storage technologies adapts to rapid development of the data center and the high-power vehicle charging piles, which can achieve local power generation and nearby electricity consumption to reduce cable loss. In addition, DC will not cause reactive power loss, and there is no issue of reactive power balance and stability, and thus it can improve the system efficiency and the reliability of the power grid operation.

A basic topology structure of the medium-voltage DC micro-grid includes an AC/DC converter connected to an AC power grid. In operation of the AC/DC converter, since a Pulse Width Modulation (PWM) technology is used, a system common-mode voltage is generated, and the common-mode voltage is superimposed on a differential-mode voltage, which results in an increase in voltages at an AC input terminal and a neutral point of a bus with respect to ground. In addition, due to presence of a common-mode loop, a common-mode current may be generated in the common-mode loop, and if it is not addressed, the common-mode current would cause problems such as insulation, interference, and heat dissipation. A higher common-mode current may cause higher loss and lower efficiency of the converter.

In summary, how to reduce the common-mode current of the conversion circuit is a technical problem that needs to be solved urgently.

In the related art, an Alternating Current/Direct Current (AC/DC) converter in the medium-voltage DC micro-grid converts electrical energy of an AC power grid into a DC bus output. According to current industry convention, the medium-voltage AC voltage is ≥1 kVAC, and the medium-voltage DC voltage is ≥1.5 kVDC.

The system common-mode voltage generated when the AC/DC converter is operating is superimposed on the differential-mode voltage, which may cause an increase in the voltages at the AC input terminal and the neutral point of the bus with respect to ground, and generate the common-mode current, resulting in higher loss and lower efficiency of the conversion device.

An exemplary embodiment provides a conversion device to reduce the common-mode current of the conversion device.

Figure 3:
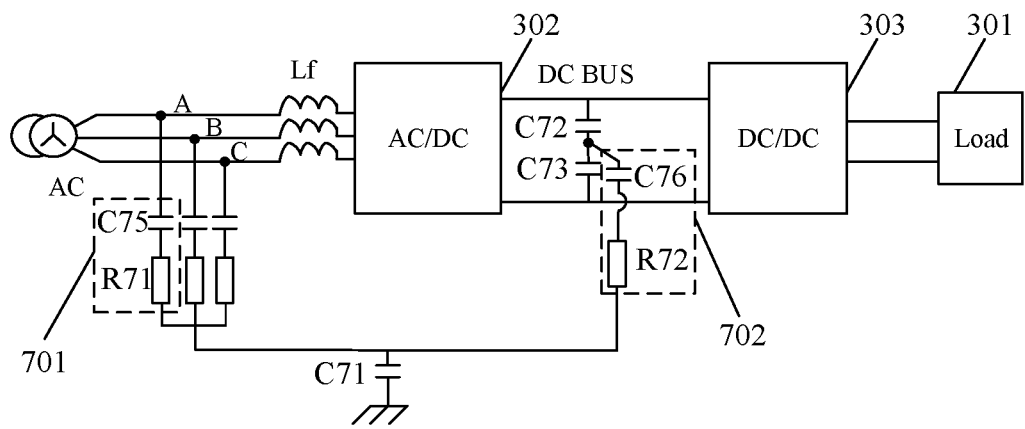
FIG. 3 is a structural schematic diagram schematically showing another conversion device in an embodiment of the present disclosure.

As shown in FIG. 3, embodiments of the present disclosure provide a conversion device connected between an AC grid and a load 301. The conversion device includes: an inductor Lf, electrically connected to the AC power grid; a first-stage converter 302, a first end of the first-stage converter 302 being connected to the inductor Lf, and a second end of the first-stage converter 302 being electrically connected to a DC bus, and first-stage converter 302 being configured to output a bus voltage based on the AC power grid, and a second-stage converter 303, a first end of the second-stage converter 303 being electrically connected to the bus and a second end of the second-stage converter 303 being electrically connected to the load 301, and the second-stage converter 303 being configured to convert the bus voltage into an output voltage to provide energy to the load 301.

As shown in FIG. 3, the conversion device can further include a filtering network, and the filtering network has a first terminal, a second terminal and a third terminal. A first resistance-capacitance circuit 701 is disposed between the first terminal and the third terminal of the filtering network, and a second resistance-capacitance circuit 702 is disposed between the second terminal and the third terminal of the filtering network. The first terminal of the filtering network is electrically connected to the AC power grid, and the third terminal of the filtering network is grounded through a first capacitor C71.

Figure 12:
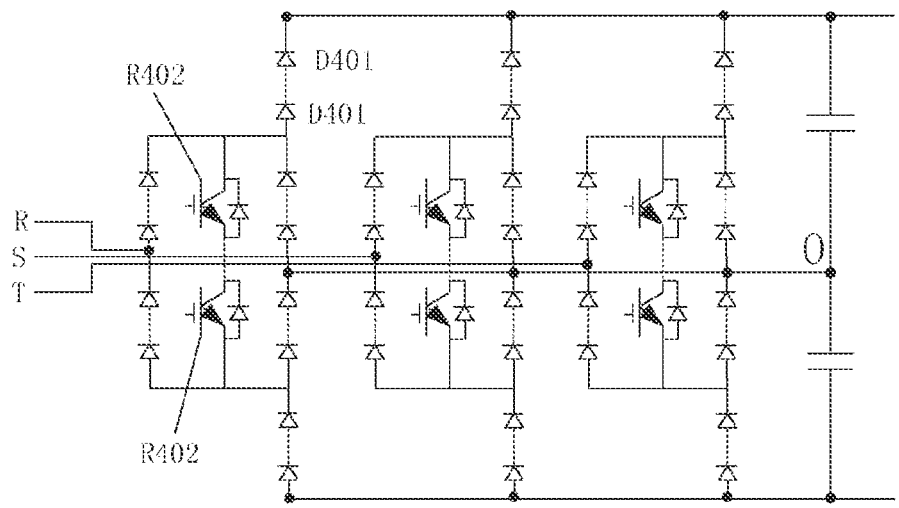
FIG. 12 is a schematic diagram schematically showing another AC/DC topology structure in an embodiment of the present disclosure.

The first resistance-capacitance circuit 701 includes a first resistor R71 and a fifth capacitor C75 connected in series, and the second resistance-capacitance circuit 702 includes a second resistor R72 and a sixth capacitor C76 connected in series. As shown in FIG. 12, the first terminal of the filtering network is a three-phase access terminal, and each of the phases includes the first resistance-capacitance circuit 701. One end of the first resistance-capacitance circuits 701 of the three phases respectively corresponds to the three-phase input of the AC power grid, and the other end of the first resistance-capacitance circuits 701 of the three phases is connected to the third terminal of the filtering network. The second terminal of the filtering network is a single-phase access terminal, one end of the second resistance-capacitance circuit 702 is connected to the second terminal of the filtering network, and the other end of the second resistance-capacitance circuit 702 is connected to the third terminal of the filtering network.

As shown in FIG. 3, the second terminal of the filtering network is electrically connected to the bus end. Specifically, a second capacitor C72 and a third capacitor C73 which are connected in series are connected between the buses, and the second terminal of the filtering network is electrically connected between the second capacitor C72 and the third capacitor C73.

When the conversion device is operating, since the PWM modulation technology is employed, the system common-mode voltage may be generated, and the common-mode voltage is superimposed on a differential-mode voltage, which will cause an increase in voltages at the AC input terminal and a neutral point of the bus with respect to ground. In addition, due to presence of a common-mode loop, a common-mode current may be generated in the common-mode loop, and if it is not addressed, the common-mode current would cause problems such as insulation, interference, and heat dissipation.

In the embodiments of the present disclosure, the filtering network has three terminals, and by disposing the first resistance-capacitance circuit 701 and the second resistance-capacitance circuit 702 in the filtering network, the common-mode current in the conversion device can be reduced.

Figure 4:
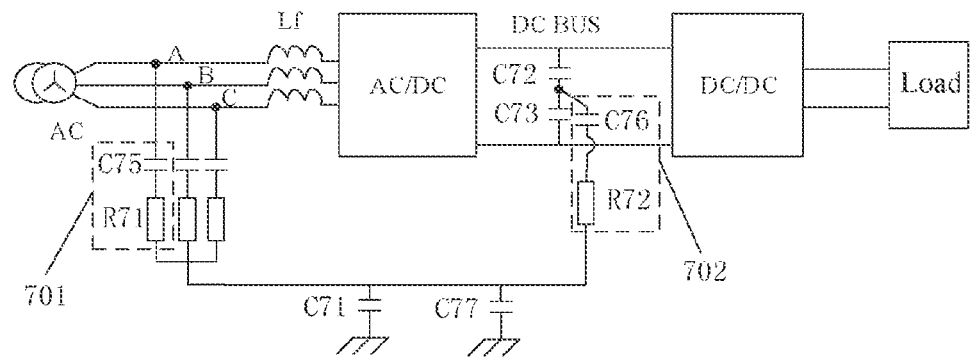
FIG. 4 is a structural schematic diagram schematically showing yet another conversion device in an embodiment of the present disclosure.

As shown in FIG. 4, a difference of FIG. 4 from FIG. 3 is that the third terminal of the filtering network can also be grounded through the first capacitor C71 and a seventh capacitor C77, respectively.

Figure 5:
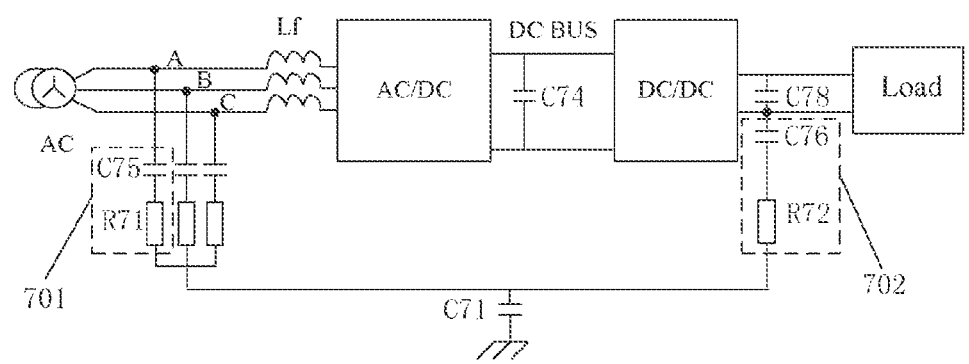
FIG. 5 is a structural schematic diagram schematically showing yet another conversion device in an embodiment of the present disclosure.

As shown in FIG. 5, a difference of FIG. 5 from FIG. 3 is that a fourth capacitor C74 can be connected between the buses. The second terminal of the filtering network is electrically connected to the second end of the second-stage converter. Specifically, an eighth capacitor C78 is also connected to between the second terminals of the second-stage converter. One end of the second resistance-capacitance circuit is electrically connected to one of the second terminals of the second-stage converter. In one embodiment, one end of the second resistance-capacitance circuit is electrically connected to the ground terminal of the second terminals of the second-stage converter.

In the embodiment of the present disclosure, as shown in FIG. 3, FIG. 4, and FIG. 5, the inductor can be a common-mode and differential-mode integrated inductor Lf. As shown in FIGS. 6, 7, 8, 9, and 10, the inductor can include a differential-mode inductor Ldiff and a common-mode inductor Lcm independent from each other.

In addition, in the embodiments of the present disclosure, the common-mode inductor is used in the filtering network to form a common-mode filtering network.

As shown in FIG. 3, FIG. 4, and FIG. 5, the inductor Lf is a common-mode and differential-mode integrated reactor, which can filter both the differential-mode signal and the common-mode signal. As shown in FIG. 3, one end of the common-mode filtering network is connected to the neutral point of the bus, that is, a connection point of the second capacitor C72 and the third capacitor C73, and the other end is connected to the AC power grid and is grounded through the safety capacitor C71. In this way, the voltage at the neutral point of the bus is forced to be pulled to a potential close to the ground. The power grid side thereof is also connected to the ground through resistance and capacitance circuit to reduce the voltage of the power grid side with respect to ground.

A design of the common-mode filtering network can effectively reduce the voltage at the neutral point of the bus and the voltage of the power grid side with respect to ground, and limit amplitude of the common-mode current.

Specific specifications for reducing the voltage of the neutral point of the bus and the power grid side to ground are as follows: under rated operating conditions, the AC input voltage with respect to ground ≤1.5*phase voltage peak value, and a common-mode voltage jump ≤1500V/uS.

In the embodiments of the present disclosure, when the inductor includes the differential-mode inductor and the common-mode inductor, the differential-mode inductor Ldiff is connected between the AC power grid and the first-stage converter, and the common-mode inductor Lcm is disposed between the differential-mode inductor and the load.

Figure 6:
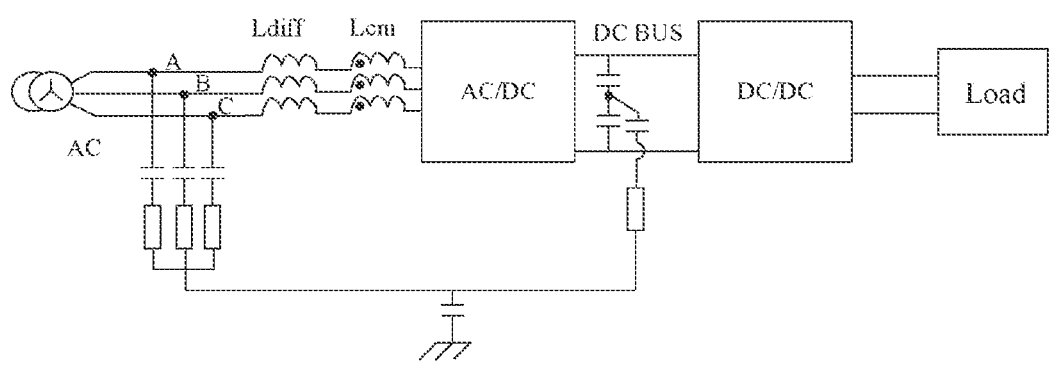
FIG. 6 is a structural schematic diagram schematically showing yet another conversion device in an embodiment of the present disclosure.
Figure 7:
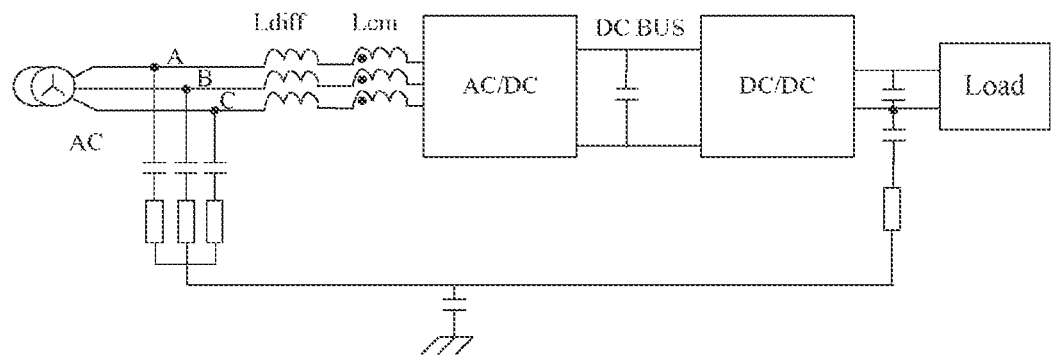
FIG. 7 is a structural schematic diagram schematically showing yet another conversion device in an embodiment of the present disclosure.

Specifically, as shown in FIG. 6 and FIG. 7, the conversion device includes the differential-mode inductors Ldiff and the common-mode inductors Lcm of three phases. In each of the phases, the differential-mode inductor Ldiff and the common-mode inductor Lcm are connected in series, and are electrically connected between the AC power grid and the first-stage converter. Here, the common-mode inductors and the differential-mode inductors are designed independently and are disposed at the access end of the AC power grid after being connected in series.

Figure 8:
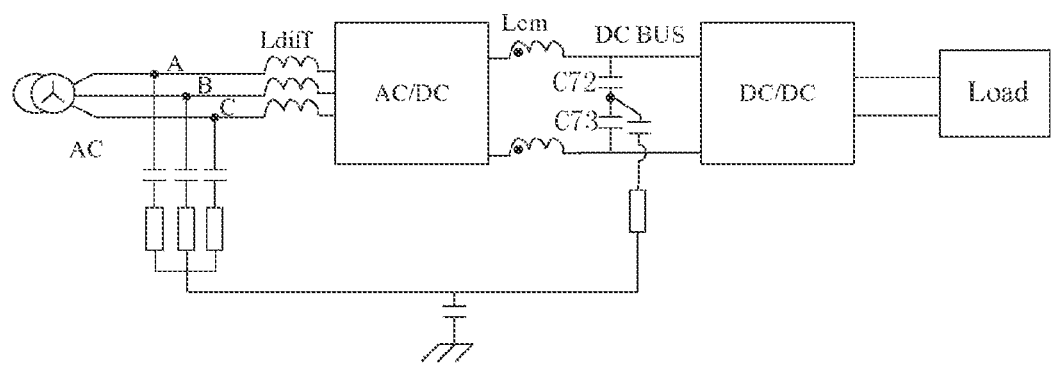
FIG. 8 is a structural schematic diagram schematically showing yet another conversion device in an embodiment of the present disclosure.
Figure 9:
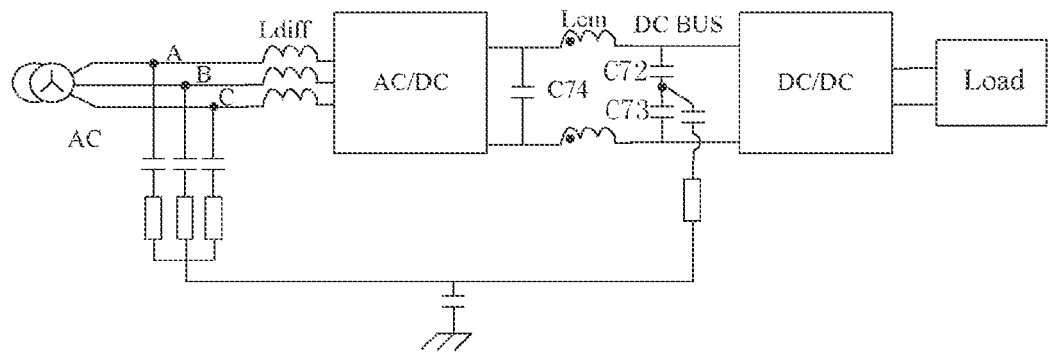
FIG. 9 is a structural schematic diagram schematically showing yet another conversion device in an embodiment of the present disclosure.
Figure 10:
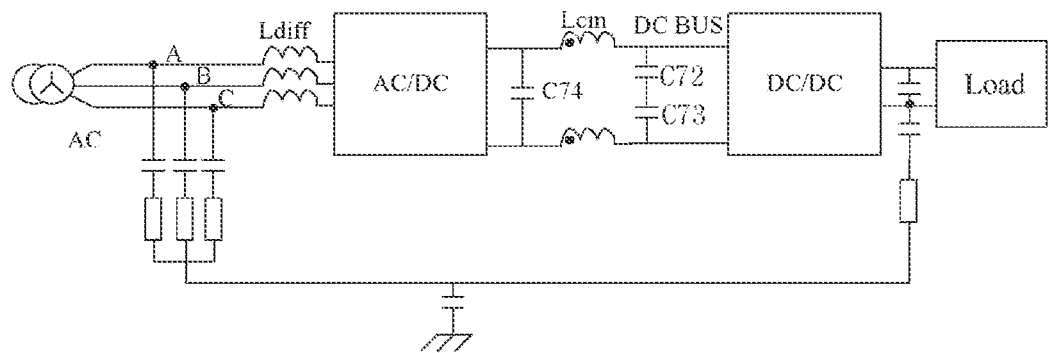
FIG. 10 is a structural schematic diagram schematically showing yet another conversion device in an embodiment of the present disclosure.

As shown in FIGS. 8, 9 and 10, the common-mode inductors Lcm and the differential-mode inductors Ldiff can be independently designed, and the differential-mode inductors Ldiff of three phases are electrically connected between the AC power grid and the first-stage converter. The common-mode inductors Lcm of two phases are respectively disposed between the two terminals of the DC bus, that is, the AC power grid and the second terminals of the second-stage converter, and can be located between the first terminal and the second terminal of the filtering network.

In FIG. 8, the common-mode inductors Lcm are disposed between the second terminal of the first-stage converter and a serial branch formed by the second capacitor C72 and the third capacitor C73 connected in series. In FIGS. 9 and 10, the common-mode inductors Lcm are disposed between the fourth capacitor C74 and the serial branch formed by the second capacitor C72 and the third capacitor C73 connected in series. At this point, the fourth capacitor C74 can absorb the leakage inductance energy of the leakage inductance of the common-mode inductor to solve the influence of the leakage inductance of the common-mode reactor.

In the embodiment of the present disclosure, the first-stage converter 302 can be an N-level AC-DC converter, and the N-level AC-DC converter includes a plurality of switching bridge arms, both an upper arm and a lower arm of each of the switching bridge arms of the AC-DC converter include a plurality of semiconductor devices connected in series, and a rated withstand voltage value Vsemi of each of the semiconductor devices is greater than or equal to (Vbus*δ)/((N−1)*Nseries*λ), where Vbus represents the bus voltage, δ represents bus fluctuation, N represents the number of levels of the first-stage converter, λ represents a voltage derating factor of the semiconductor device and λ≤1, Nseries represents the number of semiconductor devices connected in series, and Nseries≥2.

The basic topology structure of the medium-voltage DC micro-grid includes an AC/DC converter connected to the AC power grid, and the AC/DC converter controls the output to the DC bus. The AC/DC converter generally employs high-voltage semiconductor devices an operating frequency of which is low, and it is required to design the filter having a lower cut-off frequency, resulting in an increase in the size and cost of the filter, which in turn leads to an increase in the size and cost of the conversion device between the AC power grid and the load When a structure in which multiple semiconductor devices are connected in series is adopted, the semiconductor devices with high switching frequencies connected in series can be used. For example, Insulated Gate Bipolar Transistor (IGBT) switches with a withstand voltage of 1700V can be connected in series to replace the IGBT with a withstand voltage of 4500V. Since the switching frequency of the IGBT with the withstand voltage of 1700V can reach a maximum switching frequency of 3 kHz, which is much higher than that of the IGBT with the withstand voltage of 4500V, the converter can operate at a relatively high switching frequency, which can increase the cut-off frequency of the filter, reduce the size of the filter, and reduce the cost of the filter.

Figure 11:
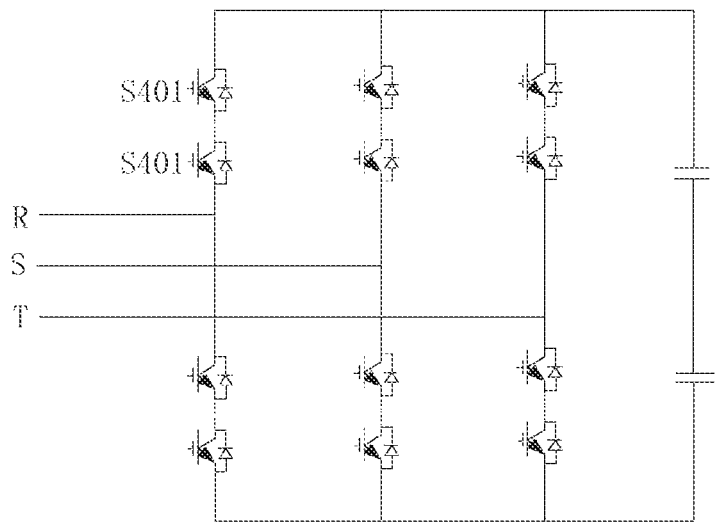
FIG. 11 is a schematic diagram schematically showing an AC/DC topology structure in an embodiment of the present disclosure.
Figure 13:
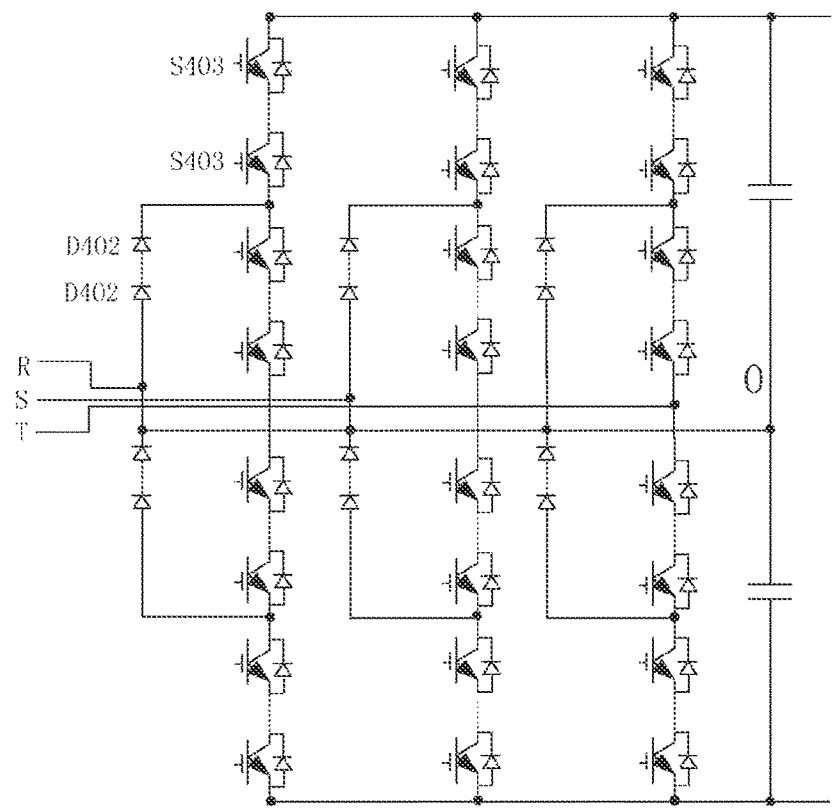
FIG. 13 is a schematic diagram schematically showing yet another AC/DC topology structure in an embodiment of the present disclosure.

In the embodiments of the present disclosure, the first-stage converter can be a two-level or three-level AC/DC converter, and is not limited thereto. As shown in FIGS. 11, 12 and 13, the topology structure of the AC/DC converter includes, but is not limited to, a two-level rectifier, a three-level Vienna rectifier, and a three-level neutral point clamped converter.

In the three-phase two-level rectifier as shown in FIG. 11, each of the upper bridge arm and the lower bridge arm of each of the phases includes two semiconductor devices which are connected in series, that is, power tubes S401. The power tubes shown in FIG. 11 are IGBTs, but it is not limited thereto in practical applications.

In the prior art, the bridge arm of each of the phases of the three-phase three-level Vienna rectifier includes a bidirectional switch composed of one power tube and four diodes, and two upper and lower diodes used for freewheeling. In the three-phase three-level Vienna rectifier as shown in FIG. 12, the power tube in the bridge arm of each of the phases of the three-phase three-level Vienna rectifier in the prior art is replaced by two power tubes S402 connected in series, and each of the diode in each bridge arm of the three-phase three-level Vienna rectifier in the prior art is replaced by two diodes D401 connected in series.

In the prior art, the bridge arm of each of the phases of the three-phase three-level neutral point clamped converter includes four power tubes and two diodes.

As shown in FIG. 13, in the three-phase three-level neutral point clamped (NPC) converter, the power tubes in the bridge arm of each of the phases of the three-phase three-level neutral point clamped converter in the prior art are replaced by two power tubes S403 connected in series, and each of the diodes in each bridge arm of the three-phase three-level neutral point clamped converter in the prior art are replaced by two diodes D402 connected in series.

In the exemplary embodiments of the present disclosure, the load can be a DC load, and correspondingly, the second-stage converter can be a DC-DC converter, and the DC-DC converter is electrically connected to the DC load. In addition, the load can also be an AC load, and correspondingly, the second-stage converter can be a DC-AC converter, and the DC-AC converter is electrically connected to the AC load.

When the second-stage converter is the DC/DC converter, the DC-DC converter can have multiple topology structures, and a single primary side module of the DC-DC converter can adopt a two-stage or multi-stage topology. A single semiconductor device or a structure in which multiple semiconductor devices are connected in series, in parallel or in series-parallel can be used for the semiconductor devices of the DC-DC converter. An output mode of an output isolated or non-isolated from the primary side can be used for a secondary side of the DC-DC converter, and connections in parallel, in series or in series-parallel can be used in the secondary side of the DC-DC converter according to the requirements of the load.

Figure 14:
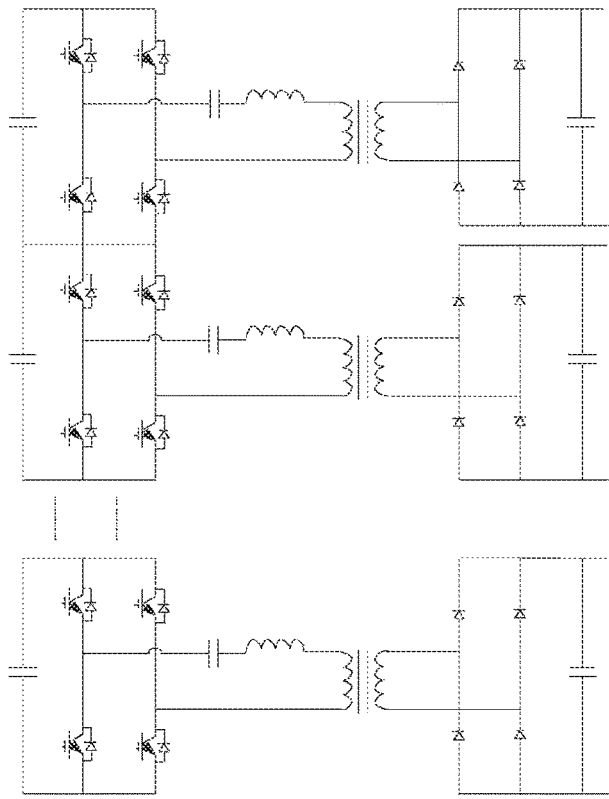
FIG. 14 is a schematic diagram schematically showing a DC/DC topology structure in an embodiment of the present disclosure.
Figure 15:
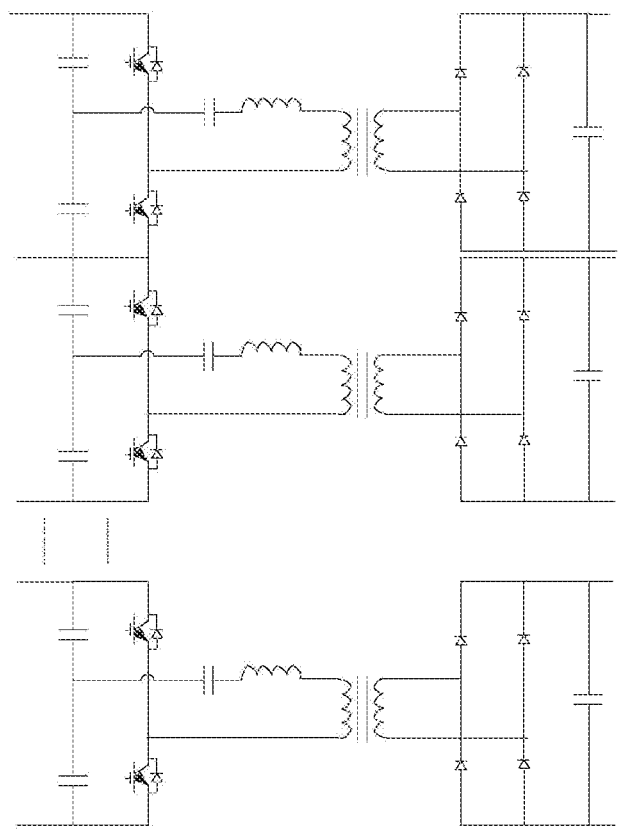
FIG. 15 is a schematic diagram schematically showing another DC/DC topology structure in an embodiment of the present disclosure.
Figure 16:
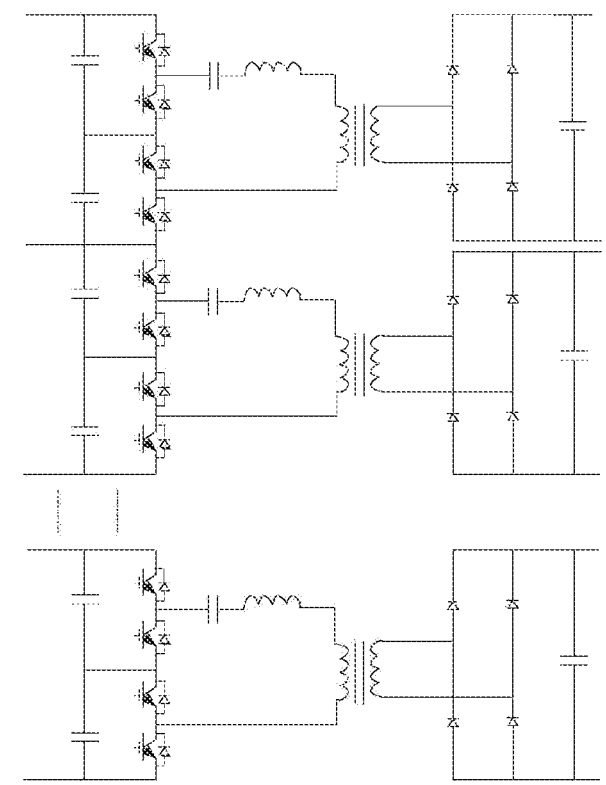
FIG. 16 is a schematic diagram schematically showing yet another DC/DC topology structure in an embodiment of the present disclosure.
Figure 17:
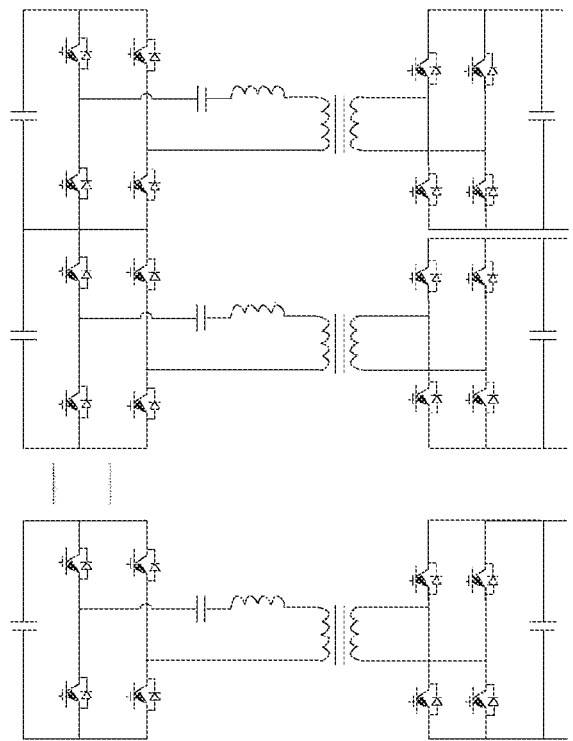
FIG. 17 is a schematic diagram schematically showing yet another DC/DC topology structure in an embodiment of the present disclosure.
Figure 18:
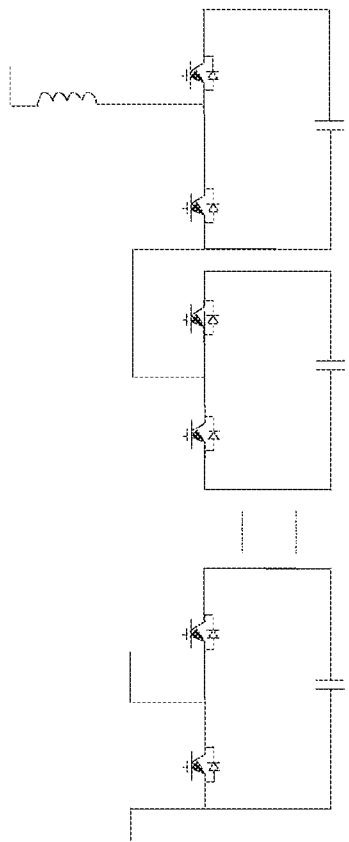
FIG. 18 is a schematic diagram schematically showing yet another DC/DC topology structure in an embodiment of the present disclosure.

Specifically, the DC-DC converter of the embodiments of the present disclosure can be a full-bridge LLC DC/DC converter with serial connections in the primary side as shown in FIG. 14, a DC/DC converter containing a half-bridge LLC circuit with serial connections in the primary side as shown in FIG. 15, a DC/DC converter containing a three-level half-bridge LLC circuit with serial connections in the primary side as shown in FIG. 16, a DC/DC bidirectional converter containing a Dual-Active-Bridge (DAB) circuit with serial connections in the primary side as shown in FIG. 17, or a non-isolated DC/DC bidirectional converter as shown in FIG. 18.

In the embodiments of the present disclosure, the conversion device further includes a controller (not shown in the figure) which detects power of the load and controls operating states of the at least two AC-DC converters connected in parallel based on the power of the load.

Figure 19:
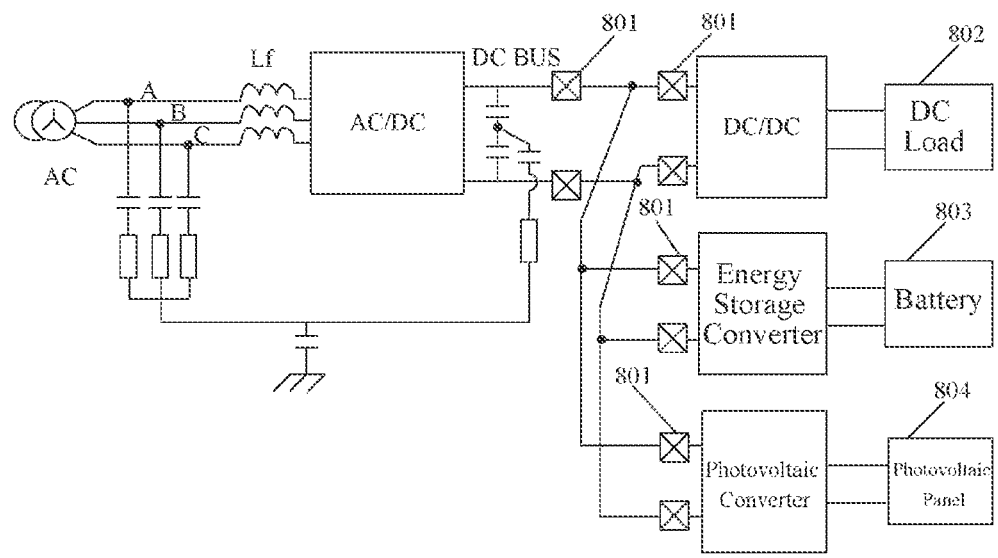
FIG. 19 is a structural schematic diagram schematically showing yet another conversion device in an embodiment of the present disclosure.

As shown in FIG. 19, the conversion device further includes a DC circuit breaker 801 which is disposed between the first-stage converter and the second-stage converter. The DC circuit breaker 801 is electrically connected to the controller, and operations of the DC circuit breaker 801 are controlled based on a control signal sent by the controller.

In the medium-voltage DC micro-grid system, it is easy for a new energy entity access, the cost of lines is low, the loss is small, there is no problems of reactive power balance and stability, and the reliability of the power grid operation is higher. Based on the advantages of the DC micro-grid, in the DC micro-grid system according to the embodiments of the present disclosure as shown in FIG. 19, new energy entities such as a DC load 802, a battery 803, and a photovoltaic panel 804 can be connected, thereby realizing the power generation and power consumption functions of the DC micro-grid and realizing the bidirectional flow of energy.

The DC power grid has the disadvantages of low inertia, rapid rise of a short-circuit current in the case of a short circuit, and high peak current. With respect to the short circuit fault of the DC micro-grid, it is proposed to connect the DC circuit breaker 801 in series at the access end of the energy entity to achieve reliable disconnection in the case of the short circuit fault.

In the architecture of the medium-voltage DC micro-grid in the embodiments of the present disclosure, the new energy entities such as the battery and the photovoltaic panel and the medium-voltage DC bus are connected and disconnected through the DC circuit breaker 801. The DC circuit breaker 801 can detect the operating conditions by itself, disconnect a fault point when a fault occurs, and transmit information to the controller. The controller performs an overall management based on the uploaded signal. The overall management can include setting a fault priority by the controller, for example, the short circuit is in a first priority, and an overcurrent is in a second priority. When the fault is in the first priority, the DC circuit breaker will cut off the fault by itself when detecting it, and when the fault is in the second priority or a lower priority, the controller sends a cut-off signal to control on/off of the DC circuit breaker based on the information of the DC circuit breaker.

In the topology architecture shown in FIG. 19, structures of the power grid, the load, the power generation, the energy storage and the like are integrated. A central control system where the control is located can receive control instructions from a monitoring system to charge and discharge the battery, quickly absorb or release energy by using the energy storage system where the battery is located, smooth voltage fluctuations caused by the photovoltaic grid-connected power generation, improve a balance level of the active power and reactive power of the system, and enhance the stability. The energy storage system can be used to improve a dispatchability of photovoltaic power generation, and a charge-discharge control mode can be formulated through an analysis of a distribution of a local power peak and valley time and electricity price to maximize economic benefits with a high throwing and bargain-hunting. The energy storage system in cooperation with the photovoltaic power station will further improve a good matching between the photovoltaic power generation and the power grid, the problem of "large installed capacity and small power generation" of photovoltaic power generation is alleviated by smoothing the power output and "peak-cutting and valley filling", which greatly reduces requirements of conventional photovoltaic power plants on the power transmission capacity of the power grid, thereby avoiding the constraints of insufficient power grid construction on the power generation of the photovoltaic power plants.

Figure 20:
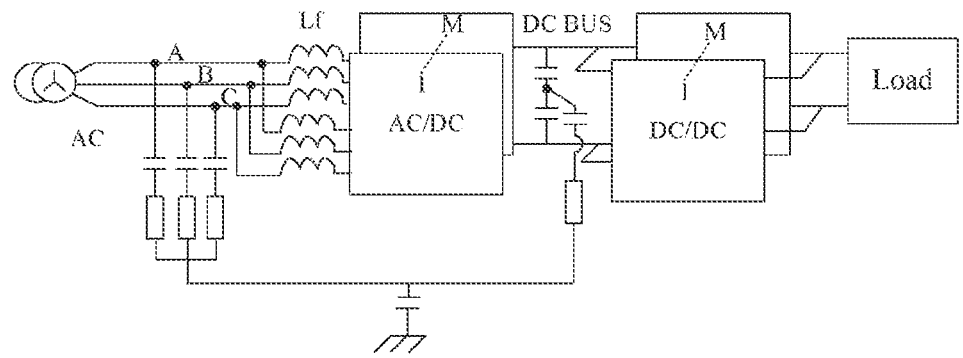
FIG. 20 is a structural schematic diagram schematically showing yet another conversion device in an embodiment of the present disclosure.
Figure 21:
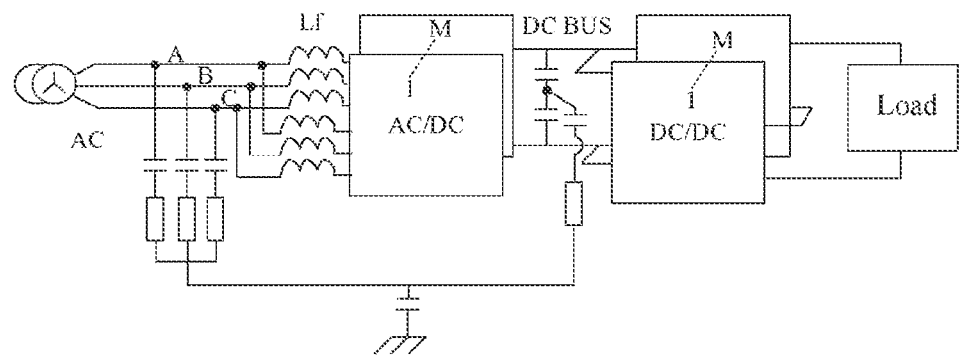
FIG. 21 is a structural schematic diagram schematically showing yet another conversion device in an embodiment of the present disclosure.

As shown in FIGS. 20 and 21, the first-stage converter can include two or more AC-DC converters connected in parallel. The second-stage converter can include two or more DC-DC converters. As shown in FIG. 20, there are M DC-DC converters in the second-stage converter, where M is a natural number greater than or equal to 2. As shown in FIG. 21, the M DC-DC converters in the second-stage converter are connected in series, where M is a natural number greater than or equal to 2. In addition, the second-stage converter can also include two or more DC-AC converters, and the two or more DC-AC converters can be connected in parallel or in series.

In the embodiments of the present disclosure, in a case where the load is full, all the AC-DC converters are operating. In a case where the load is light load or half load, the controller controls parts of the at least two AC-DC converters connected in parallel to operate, and controls remaining of the at least two AC-DC converters connected in parallel not to operate.

Specifically, as shown in FIG. 20, a multi-machine parallel connection is used for the AC/DC converters and is used for an output side of the DC/DC converters in the conversion device. When the load side is fully loaded, the multiple AC/DC machines operate, and when the load side is the lightly loaded or half loaded, the medium-voltage controller can shut down parts of the AC/DC converters according to the power of the load and control the remaining of the AC/DC converters to operate at the rated load or at an operating point of optimal efficiency so as to maximize the efficiency.

As shown in FIG. 21, in the conversion device, the multi-machine parallel connection is used for the AC/DC converters, and based on the voltage demand of the load, a multi-machine serial connection is used on the secondary output side of the DC/DC converters. When the load side is fully loaded, the multiple AC/DC machines operate, and when the load side is the lightly loaded or half loaded, the controller can shut down parts of the AC/DC converters according to the power of the load and control the remaining of the AC/DC converters to operate at the rated load or the operating point of optimal efficiency so as to maximize the efficiency.

In addition, in many practical applications, it may be inconvenient to carry the device for a floor where the power consumption terminal is located. If the entire conversion device is placed on the power consumption terminal, in addition to the problem of carrying, it takes up a large floor area and increases the load-bearing of the floor. In the conversion device of the embodiments of the present disclosure, the first-stage converter and the second-stage converter can be placed separately. The first-stage converter can be placed at a remote end such as a basement, the second-stage converter can be close to the power consumption terminal, and the two are connected through the medium-voltage DC power grid.

In the conversion device of the embodiments of the present disclosure, by disposing the filtering network and disposing the first resistance-capacitance circuit 701 and the second resistance-capacitance circuit 702 in the filtering network, the common-mode current in the conversion device can be reduced.

It will be easy for those skilled in the art to think of other implementations of the present disclosure in consideration of the specification and practice of the present disclosure disclosed herein. The present application is intended to cover any variations, uses, or adaptations of the present disclosure which follow the general principles of the present disclosure and include common general knowledge or conventional technical measures in the art that are not disclosed in the present disclosure. The specification and embodiments are merely illustrative, and a true scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A conversion device, connected between an Alternating Current (AC) power grid and a load, the conversion device comprising:

an inductor electrically connected to the AC power grid;

a first-stage converter having a first terminal electrically connected to the inductor and a second terminal electrically connected to a bus, and the first-stage converter being configured to output a bus voltage based on an input voltage from the AC power grid;

a second-stage converter having a first terminal electrically connected to the bus and a second terminal electrically connected to the load, and the second-stage converter being configured to convert the bus voltage into an output voltage to provide energy to the load; and a filtering network having a first terminal, a second terminal and a third terminal, wherein a first resistance-capacitance circuit is disposed between the first terminal and the third terminal of the filtering network, a second resistance-capacitance circuit is disposed between the second terminal and the third terminal of the filtering network, the first terminal of the filtering network is electrically connected to the AC power grid, the second terminal of the filtering network is electrically connected to the bus or the second terminal of the second-stage converter, and the third terminal of the filtering network is grounded through at least one of a first capacitor and a seventh capacitor, wherein a second capacitor and a third capacitor are connected in series across the bus, and the second terminal of the filtering network is electrically connected with the second capacitor and the third capacitor, wherein the first-stage converter comprises an N-level Alternating Current-Direct Current (AC-DC) converter, and the N-level AC-DC converter comprises a plurality of switching bridge arms, both an upper arm and a lower arm of each of the switching bridge arms of the AC-DC converter comprise a plurality of semiconductor devices connected in series, and a rated withstand voltage Vsemi of each of the plurality of semiconductor devices is greater than or equal to $(Vbus*\delta)/((N-1)*Nseries*\lambda)$, wherein Vbus represents the bus voltage, $\delta$ represents bus fluctuation, N represents a number of levels of the first-stage converter, $\lambda$ represents a voltage derating factor of a respective semiconductor device of the plurality of semiconductor devices, and $\lambda \leq 1$, and Nseries represents a number of semiconductor devices of the plurality of semiconductor devices connected in series and Nseries$\geq 2$, and wherein the conversion device further comprises a controller and a DC circuit breaker, the DC circuit breaker is disposed between the first-stage converter and the second-stage converter and is electrically connected to the controller, and an operation of the DC circuit breaker is controlled based on a control signal sent by the controller.

2. The conversion device according to claim 1, wherein the inductor comprises a common-mode and differential-mode integrated inductor, and is disposed between the AC power grid and the first-stage converter.

3. The conversion device according to claim 1, wherein the inductor comprises a differential-mode inductor and a common-mode inductor, the differential-mode inductor is connected between the AC power grid and the first-stage converter, and the common-mode inductor is disposed between the AC power grid and the second terminal of the second-stage converter.

4. The conversion device according to claim 1, wherein the inductor comprises a differential-mode inductor and a common-mode inductor, the differential-mode inductor is connected between the AC power grid and the first-stage converter, and the common-mode inductor is disposed between the first terminal and the second terminal of the filtering network.

5. The conversion device according to claim 1, wherein the first resistance-capacitance circuit comprises a first resistor and a fifth capacitor connected in series, and the second resistance-capacitance circuit comprises a second resistor and a sixth capacitor connected in series.

6. The conversion device according to claim 1, wherein the load comprises a Direct Current (DC) load or an AC load, the second-stage converter correspondingly comprises a DC-DC converter or a DC-AC converter, and the DC-DC converter or the DC-AC converter is electrically connected to the load.

7. The conversion device according to claim 1, wherein the first-stage converter comprises at least two AC-DC converters connected in parallel.

8. The conversion device according to claim 7, wherein the second-stage converter comprises at least two DC-DC converters or DC-AC converters which are connected in series or in parallel.

9. The conversion device according to claim 7, wherein the controller detects power of the load and controls operation states of the at least two AC-DC converters connected in parallel based on the power of the load.

10. The conversion device according to claim 9, wherein when the load is fully loaded, the at last two AC-DC converters operate normally.

11. The conversion device according to claim 9, wherein when the load is half loaded or less, the controller controls part of the at least two AC-DC converters connected in parallel to operate normally, and controls the remaining of the at least two AC-DC converters connected in parallel to stop operating.

12. The conversion device according to claim 1, wherein the first-stage converter comprises any one of a two-level rectifier, a three-level Vienna rectifier, and a three-level neutral point clamped converter.

* * * * *